(12) United States Patent
Grygorenko

(10) Patent No.: US 8,797,277 B1
(45) Date of Patent: Aug. 5, 2014

(54) METHOD FOR MULTIPLE TOUCH POSITION ESTIMATION

(75) Inventor: Vadym Grygorenko, Lviv (UA)

(73) Assignee: Cypress Semiconductor Corporation, San Jose, CA (US)

(*) Notice: Subject to any disclaimer, the term of this patent is extended or adjusted under 35 U.S.C. 154(b) by 733 days.

(21) Appl. No.: 12/395,188

(22) Filed: Feb. 27, 2009

Related U.S. Application Data

(60) Provisional application No. 61/067,541, filed on Feb. 27, 2008.

(51) Int. Cl.
*G06F 3/044* (2006.01)

(52) U.S. Cl.
USPC ........... 345/173; 345/156; 345/178; 345/179; 178/18.06; 178/18.01; 178/18.03; 178/19.01; 178/19.03; 178/19.04; 178/20.01

(58) Field of Classification Search
CPC .......... G06F 3/044; G06F 2203/04111; G06F 2203/04112
USPC .................. 345/173, 174, 156, 179, 178; 178/18.03, 18.06, 19.04, 18.01, 19.01, 178/19.03, 20.01
See application file for complete search history.

(56) References Cited

U.S. PATENT DOCUMENTS

| | | | |
|---|---|---|---|
| 5,495,077 A * | 2/1996 | Miller et al. ................ | 178/18.06 |
| 5,543,591 A * | 8/1996 | Gillespie et al. ........... | 178/18.03 |
| 6,825,833 B2 * | 11/2004 | Mulligan et al. ............ | 345/174 |
| 7,683,894 B2 * | 3/2010 | Kent .............................. | 345/177 |
| 7,808,255 B2 * | 10/2010 | Hristov et al. ................ | 324/686 |
| 2006/0097991 A1 | 5/2006 | Hotelling et al. | |
| 2007/0008299 A1 * | 1/2007 | Hristov ......................... | 345/173 |
| 2007/0229468 A1 * | 10/2007 | Peng et al. .................... | 345/173 |
| 2008/0012835 A1 * | 1/2008 | Rimon et al. ................. | 345/173 |
| 2008/0024455 A1 * | 1/2008 | Lee et al. ...................... | 345/173 |
| 2008/0079699 A1 * | 4/2008 | Mackey ........................ | 345/174 |
| 2008/0143717 A1 * | 6/2008 | Subramaniam ............... | 345/423 |
| 2008/0150906 A1 * | 6/2008 | Grivna .......................... | 345/173 |
| 2008/0158147 A1 * | 7/2008 | Westerman et al. .......... | 345/156 |
| 2008/0158167 A1 * | 7/2008 | Hotelling et al. ............. | 345/173 |
| 2008/0309629 A1 * | 12/2008 | Westerman et al. .......... | 345/173 |
| 2008/0309631 A1 * | 12/2008 | Westerman et al. .......... | 345/173 |
| 2009/0167725 A1 * | 7/2009 | Lee et al. ...................... | 345/178 |
| 2009/0194344 A1 * | 8/2009 | Harley et al. ................. | 178/18.06 |
| 2010/0019780 A1 * | 1/2010 | Bulea ............................ | 324/662 |
| 2010/0066701 A1 * | 3/2010 | Ningrat ........................ | 345/174 |
| 2010/0097329 A1 * | 4/2010 | Simmons et al. ............. | 345/173 |
| 2010/0156805 A1 * | 6/2010 | Brand et al. .................. | 345/173 |

OTHER PUBLICATIONS

CSR User Module, CSR v1.0, CY8C21x34 Data Sheet, Cypress Semiconductor Corporation, Oct. 6, 2005, pp. 1-36.
"Hill climbing", From Wikipedia, http://en.wikipedia.org/wiki/Hill_climbing, downloaded Feb. 27, 2009.
"Gradient descent", From Wikipedia, http://en.wikipedia.org/wiki/Gradient_descent, downloaded Feb. 27, 2009.

\* cited by examiner

*Primary Examiner* — Jason Olson
*Assistant Examiner* — Linh N Hoffner
(74) *Attorney, Agent, or Firm* — Lowenstein Sandler LLP

(57) ABSTRACT

A method of estimating multiple touch positions on a touch sensor array, based on centroids calculated in the vicinity of a local maxima determined for the touch sensor array.

20 Claims, 7 Drawing Sheets

METHOD FOR MULTIPLE TOUCH POSITION ESTIMATION

REFERENCE TO RELATED APPLICATION

This application claims the benefit of U.S. Provisional Application No. 61/067,541 filed Feb. 27, 2008.

TECHNICAL FIELD

The present invention relates generally to touch sensor devices and, more particularly, to resolving multiple touches on a touch sensor device.

BACKGROUND

One type of touchpad operates by way of capacitance sensing utilizing capacitance sensors. The capacitance detected by a capacitance sensor changes as a function of the proximity of a conductive object to the sensor. The conductive object can be, for example, a stylus or a user's finger. In a touch sensor device, a change in capacitance detected by each sensor in the X and Y dimensions of the sensor array due to the proximity or movement of a conductive object can be measured by a variety of methods. Regardless of the method, usually an electrical signal representative of the capacitance detected by each capacitive sensor is processed by a processing device, which in turn produces electrical or optical signals representative of the position of the conductive object in relation to the touch sensor pad in the X and Y dimensions. A touch-sensor strip, slider, or button operates on the same capacitance-sensing principle.

A first type of touchpad is composed of a matrix of rows and columns. Within each row or column, there are multiple sensor elements. However, all sensor pads within each row or column are coupled together and operate as one long sensor element. The number of touches a touchpad can detect is not the same as the resolution of the touchpad. For example, even though a touchpad may have the capability to detect two substantially simultaneous touches with an XY matrix, such a touchpad cannot resolve the location of the two substantially simultaneous touches. A current way to resolve the location of a second touch is if the touches arrive sequentially in time. This allows the potential locations to be evaluated to determine which locations are "actual touch" locations and which are invalid touches, also referred to as "ghost touch" locations. If both touches arrive or are detected substantially simultaneously, there is no way to resolve which of the two pairs of potential locations constitute "actual" touches, instead of invalid touches (e.g., "ghost" touches). Thus, current two-axis touch pads are configured to resolve only a location of a single touch. Similarly, such touch screens are designed to detect the presence and location of a single touch.

BRIEF DESCRIPTION OF THE DRAWINGS

Embodiments are illustrated by way of example and not intended to be limited by the figures of the accompanying drawings in which like references indicate similar elements and in which.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail or are shown in block diagram form in order to avoid unnecessarily obscuring an understanding of this description. Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. It should be noted that although embodiments may be described in regards to a "finger" touch, the term "touch" as used herein refers to the presence (i.e., in contact or close enough proximity for detection) of a conductive object (such as a finger or conductive stylus).

A multiple touch position estimation apparatus and method are described. In one embodiment, the method includes estimating multiple touch positions on a touch sensor array based on the calculation of multiple centroids in the vicinity of a local cell maxima.

Figure 1:
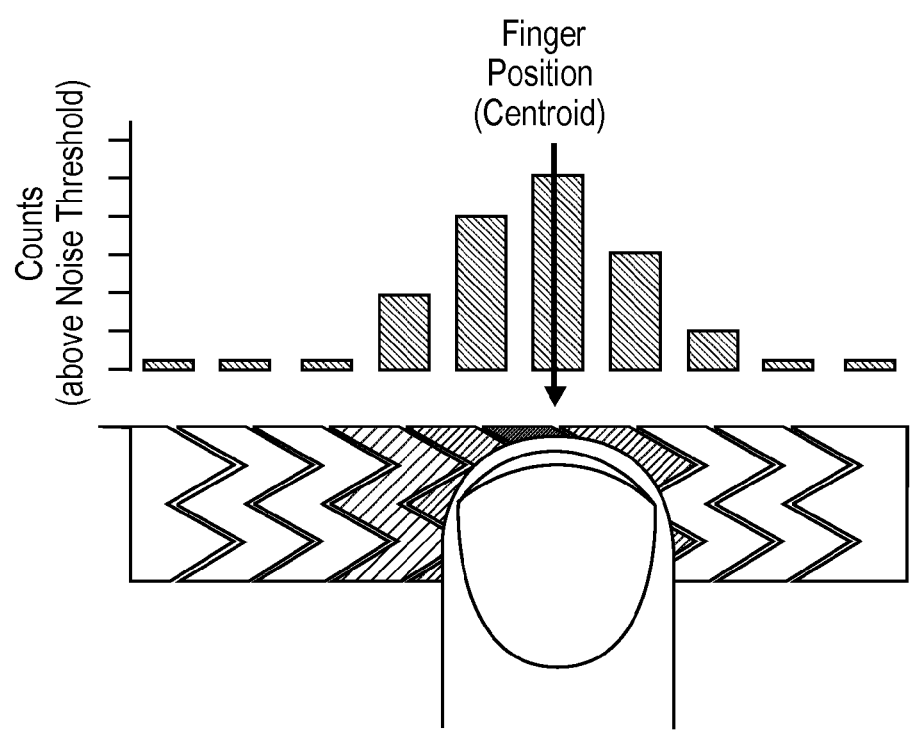
FIG. 1 is a conceptual illustration of a centroid based finger position detection method according to an embodiment.
Figure 2:
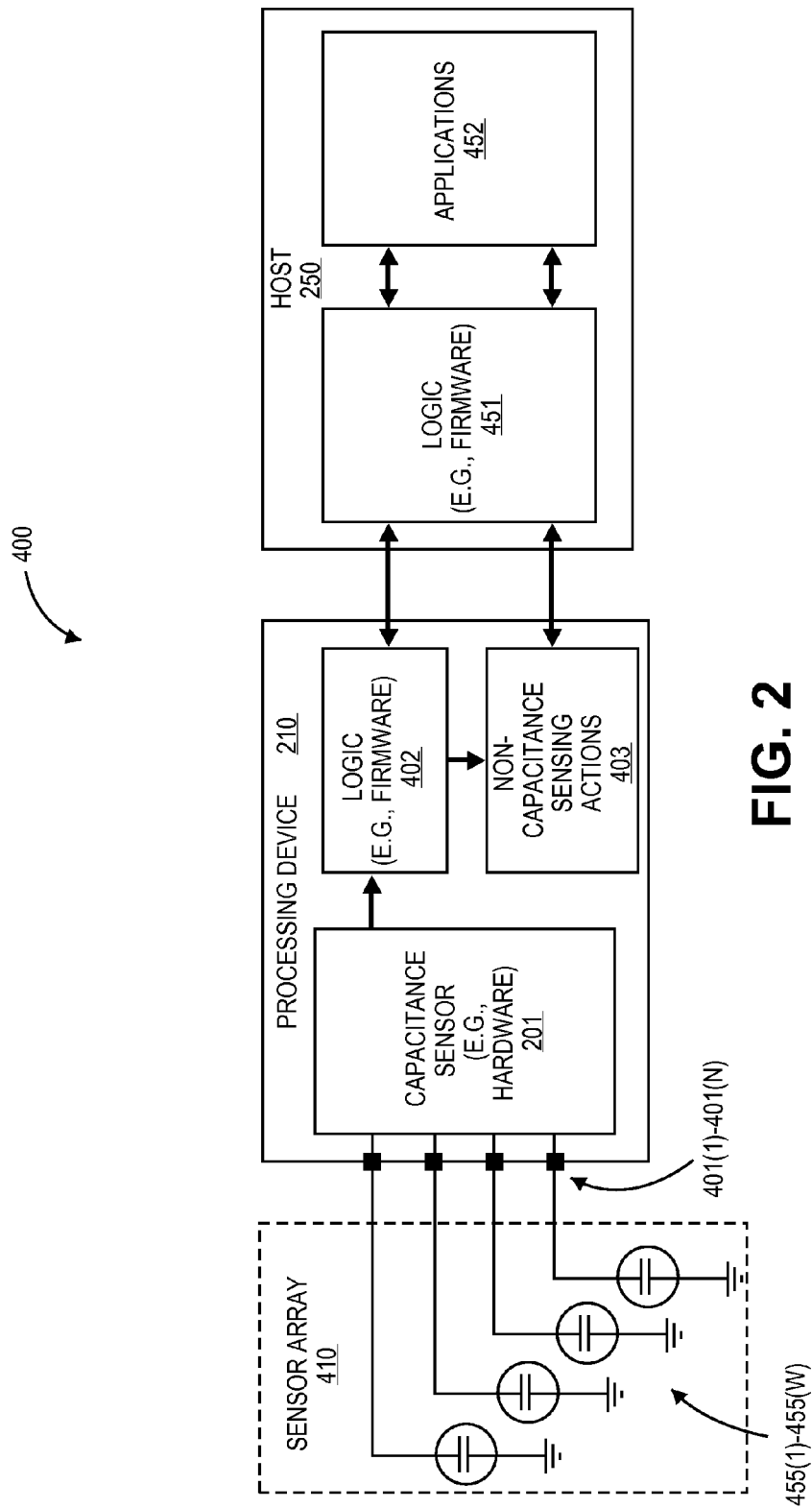
FIG. 2 illustrates a block diagram of one embodiment of an electronic device including a processing device that includes a capacitance sensor for measuring the capacitance on a sensor array and logic implementing embodiments of the present invention.

FIG. 2 illustrates a block diagram of one embodiment of an electronic device 400 including a processing device that includes a capacitance sensor for measuring the capacitance on a sensor array and logic implementing embodiments of the present invention discussed herein. The electronic device 400 includes the sensor array 410, processing device 210, and host 250. The sensor array 410 may be a single set of sensor elements that are disposed in at least one dimension of the touch-sensor device. The sensor array 410 is coupled to pins 401(1)-401(N) of the processing device 210. Each sensor element is represented as a capacitor. Sensor array 410 includes sensor elements 455(1)-455(W), where W is a positive integer value that represents the number of sensor elements of the sensor array 410. Although only four sensor elements are illustrated in FIG. 2, the set of sensor elements may include more or less sensor elements than four. In one embodiment, the capacitance sensor 201 may include a selection circuit (not illustrated). The selection circuit is coupled to the sensor elements 455(1)-455(W) and the sensing circuitry of the capacitance sensor 201. The selection circuit may be used to select which of the multiple sensor elements to provide the charge current and to measure the capacitance of each sensor element.

The processing device 210 further includes a logic block 402 to implement embodiments of the method described above. The operations of logic block 402 may be implemented in firmware; alternatively, it may be implemented in hardware or software. Processing device 210 may also include hardware or firmware for performing non-capacitance sensing actions 403. Alternatively, instead of performing the operations of the logic 402 in the processing device 210, the processing device 201 may send the raw data to a host processing device 250 for operation by logic 451. The operations of logic 451 may also be implemented in firmware, hardware, and/or software. Embodiments of the method operations described herein may be implemented in logic 402, logic 451, applications 452, or in other hardware, software, and/or firmware in the processing device 210.

Various known circuitry may be used to implement capacitance sensor 201 for detection of capacitive sensor activation. For example, such detection may be performed utilizing a capacitive switch relaxation oscillator (CSR). The CSR may be coupled to an array of sensor elements using a current-programmable relaxation oscillator, an analog multiplexer, digital counting functions, and high-level software routines as discussed above.

It should be noted that there are various known methods for measuring capacitance with a capacitance sensor. The present embodiments are not limited to using relaxation oscillators, but may include other methods known in the art, such as current versus voltage phase shift measurement, resistor-capacitor charge timing, capacitive bridge divider, charge transfer, sigma-delta modulators, charge-accumulation circuits, or the like. Additional details regarding these alternative embodiments are not included so as to not obscure the present embodiments, and because these alternative embodiments for measuring capacitance are known by those of ordinary skill in the art. A processing device having a capacitance sensor can be obtained from Cypress Semiconductor Corporation. Alternatively, processing devices having capacitance sensors may be obtained from other companies.

Raw Data Filtering

Figure 3A:
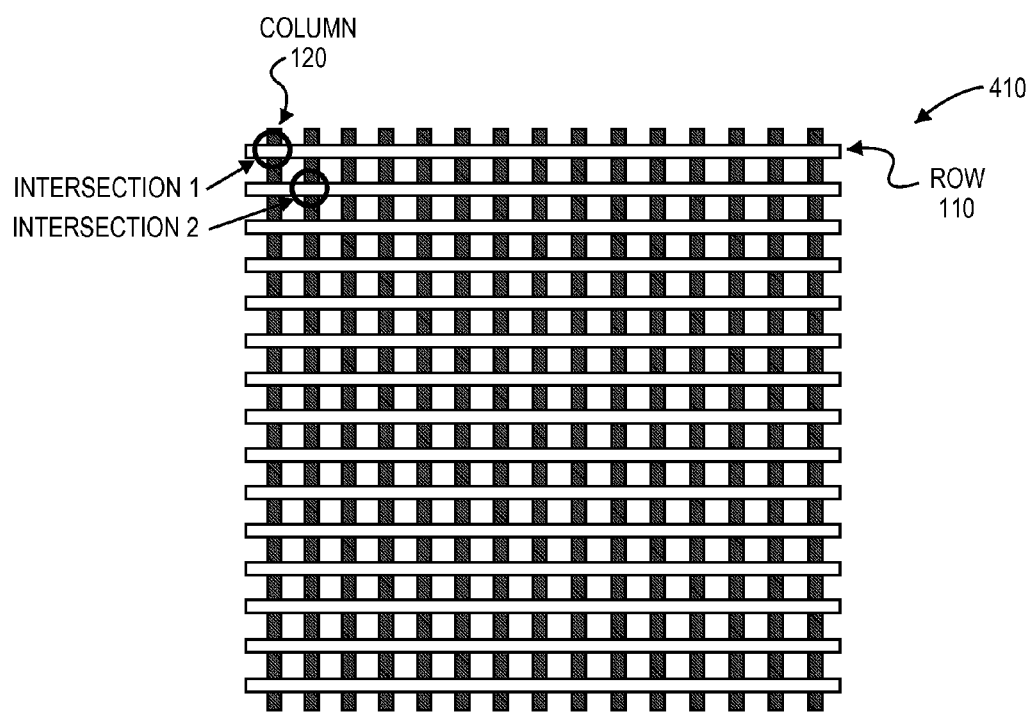
FIG. 3A illustrates row and column crossings of a touch sensor array, according to one embodiment of the present invention.

In an M column by N row (M×N) matrix of touch sensory array 410, M*N raw data conversions are performed. Each conversion represents the mutual capacitance absolute value for each row and column crossing, for example, Intersection-1 of row 110 and column 120 of array 410 as illustrated in FIG. 3A. These are sent to host processor 250 for multiple finger positions calculation. The first host 250 task is to process the inputted raw data to minimize noise. In one embodiment, such processing may be achieved by two successive filters. In one embodiment, the two filters are a median filter and a jitter filter. At first, the input value is inverted to get a signal increasing on a finger touch:

Then, in one embodiment, each signal is filtered by three-point median filter:

$$y_n[i] = \text{Median}(x_{n-2}[i], x_{n-1}[i], x_n[i]); \quad (1)$$

$$i = 1\ldots M*N$$

The output of the median filter is additionally processed by the jitter filter:

$$y_n := y_n - 1, \text{ if } y_n > y_{n-1}; \quad (2)$$

$$y_n := y_n + 1, \text{ if } y_n < y_{n-1};$$

The three-point median filter enables better spiky noise rejection compared to the use of an average filter. The jitter filter enables the cancellation of the random movement of one count around a steady position that may be encountered in a touch screen application.

Baseline and Signal Calculation

Figure 3B:
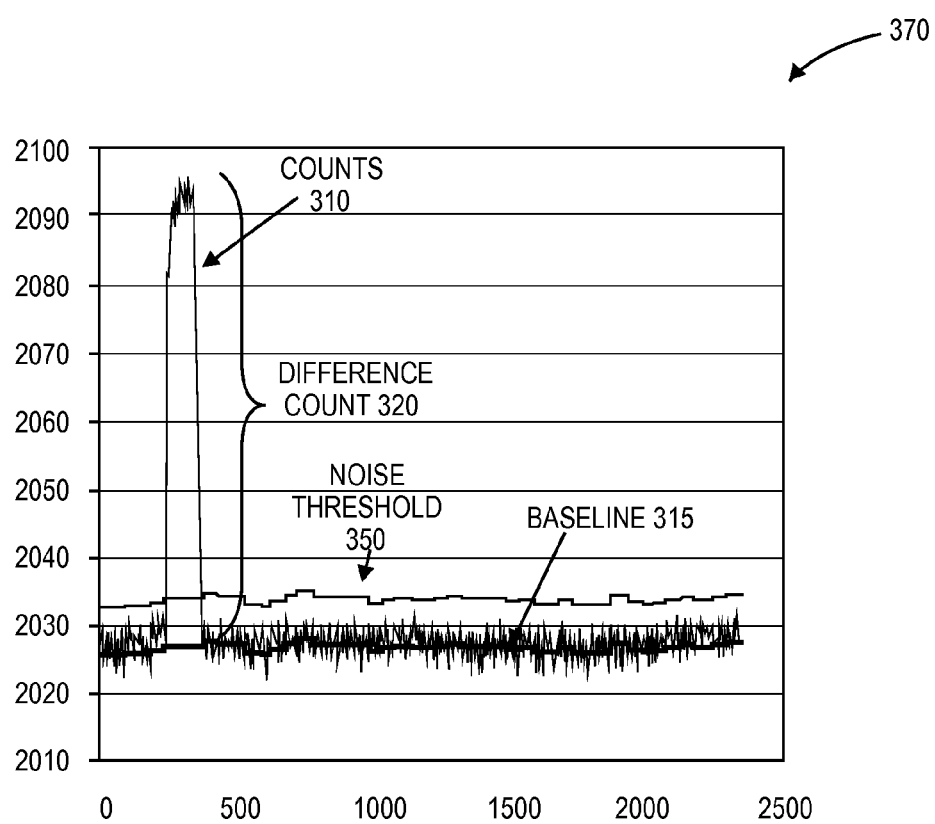
FIG. 3B is a graph illustrating a capacitance signal measurement on a single sensor element and a baseline for the signal measurement, according to an embodiment.

The second task is to establish a baseline and a touch signal calculation based on the filtered raw data. FIG. 3B is a graph 370 illustrating a capacitance signal measurement on a single sensor element and a baseline for the signal measurement. A baseline 315, or reference, may be tracked so the processing device 210 of FIG. 4 knows when a touch is present (e.g., finger on sensor element) by comparing the counts 310 (representing the capacitance due to the presence of a conductive object, such as user's finger) with the baseline 315. The baseline counts 315 are the counts that normally occur on a finger-less sensor element. In this embodiment, the sensor element signal is a difference count 320 that exceeds the baseline threshold 315. The Noise Threshold count 350 may be set so that the processing device 210 can discriminate between noise and when a finger is present on a sensor element. For example, without the presence of a finger on a sensor, the baseline 315 may be 2030 counts. When a finger is present, the counts 310 go up to, for example, to 2095 (and thus the difference count 20 is 45) which is above Noise Threshold 350.

In one embodiment, any baseline 315 calculation algorithm with an infinite impulse response (IIR) low pass filter (LPF), as is well known in the art, may be used here. The LPF is the first order IIR:

$$y_n = \frac{1}{a}[x_n + (a-1) \cdot y_{n-1}]; \quad (1)$$

$$a = 2^8.$$

In one embodiment, the baseline 315 update logic is as follows:

if Signal<Noise Threshold then update the baseline 315 using the LPF of eq (3);

if Signal≥Noise Threshold than do not update the baseline;

The Signal is calculated as difference 320 between current values of raw count 310 and baseline 315. After baseline correction, the Noise Threshold is subtracted from all signals:

$$\text{Signal}[i] := \text{Signal}[i] - NoiseThreshold;$$

$$\text{if Signal}[i] < 0 \text{ then Signal}[i] := 0$$

$$i = 1\ldots M*N$$

In one embodiment, an application executed by host 250 using the floating point values for baseline and signal calculation may be utilized. In an alternative embodiment, this algorithm may be modified for fixed point arithmetic usage. In such an embodiment, the LPF is:

$$y_n = \left[x_n + \left(1 - \frac{1}{a}\right) \cdot y_{n-1}\right]; \quad (2)$$

$$a = 2^8.$$

Filter (2) has gain of 256 in this embodiment. If the input data is one-byte wide, then the output will be a two-byte value, where the high byte can be considered as an integer part of baseline and the low byte is a fractional part of baseline. Such an approach allows use two-byte wide variables for baseline and one-byte variables for signal. So, M*N*3 bytes of memory (e.g., RAM) space will be required for baseline and signal arrays in this exemplary embodiment.

Local Maxima Search

Figure 4A:
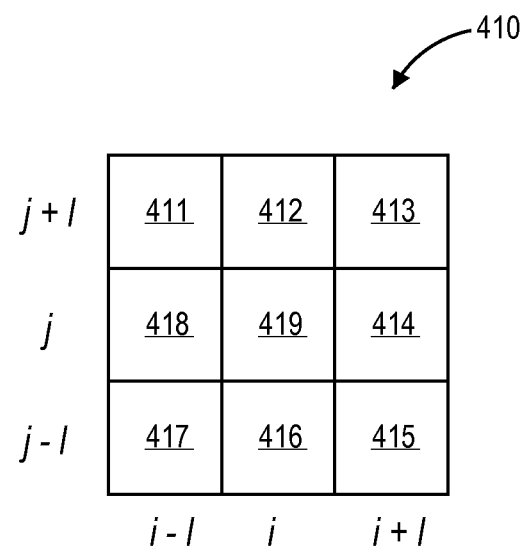
FIG. 4A illustrates cells used for maximum search and centroid calculation, according to one embodiment of the present invention.
Figure 4B:
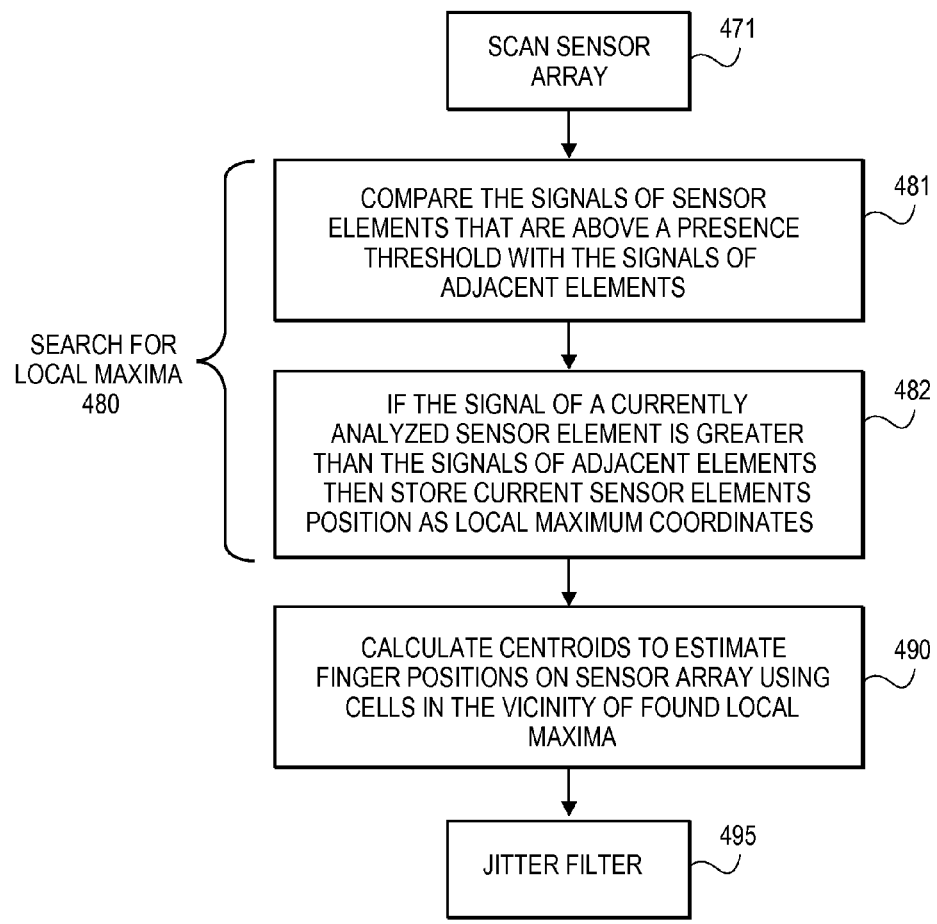
FIG. 4B illustrates a method estimating multiple touch positions on a touch sensor array based on the calculation of multiple centroids in the vicinity of a local cell maxima, according to one embodiment of the present invention.

The following discussion on local maxima search, operation 480, is made in reference to FIGS. 4A ad 4B. FIG. 4A illustrates cells used for a local maximum search and centroid calculation, according to one embodiment of the present invention. FIG. 4B illustrates a method estimating multiple touch positions on a touch sensor array based on the calculation of multiple centroids in the vicinity of local cell maxima, according to one embodiment of the present invention. First, in operation 471, the sensor array 410 is scanned. The scanning of a touch sensor array by a processing device is known in the art; accordingly, a more detailed discussion is not provided. In order to make this scanning simpler, the signal array may be reordered into a two-dimensional matrix. Rows and columns of this matrix correspond to the physical rows and columns of the sensor array (e.g., row 110 and column 120). Then, in one embodiment, each matrix (i.e., array) sensor element that exceeds the Finger Presence Threshold (e.g., sensor element 419 of FIG. 4A corresponding, for example, to intersection 2 of FIG. 3A) is compared with all adjacent elements (e.g., sensor elements 411-418 of FIG. 4A), operation 482.

If current element 419 is greater than all adjacent elements 411-418, then the current element's 419 row and column intersection position, or cell, (e.g., . . . intersection 2 of FIG. 3A) is stored as local maximum coordinates, operation 473:
if ((Signal[i,j]>FingerThreshold) &&
(Signal[i,j]>Signal[i−1,j]) &&
(Signal[i,j]>Signal[i,j−1]) &&
(Signal[i,j]>Signal[i+1,j]) &&
(Signal[i,j]>Signal[i,j+1]) &&
(Signal[i,j]>Signal[i−1,j−1]) &&
(Signal[i,j]>Signal[i+1,j−1]) &&
(Signal[i,j]>Signal[i+1,j+1]) &&
(Signal[i,j]>Signal[i−1,j+1])) {
// i and j are local maximum coordinates
// Calculate centroid here
}

It should be noted that the local maxima search operation 480 may be performed using other local maximum search techniques, for example, Hill Climbing and Gradient Descent which are terms of art; accordingly, detailed descriptions are not provided. Hill Climbing and Gradient Descent techniques are described, for example, at http://en.wikipedia.org/wiki/Hill climbing and http://en.wikipedia.org/wiki/Gradient descent, respectively. In the next operation 490, multiple centroids are calculated to estimate the multiple finger positions on sensor array 410 using cells in the vicinity of the found local maxima.

Centroid Calculation

After a local maximum is found, any centroid algorithm may used for finger position estimation, according to one embodiment of the present invention. In one embodiment, all cells adjacent to local maximum are included into the centroid calculation, operation 490, totally 3×3=9 cells in this exemplary embodiment, as follows:

$$X_c = K_x \frac{\sum_{k=i-1}^{i+1} \sum_{m=j-1}^{j+1} \text{Signal}[k,m] \cdot k}{\sum_{k=i-1}^{i+1} \sum_{m=j-1}^{j+1} \text{Signal}[k,m]} \quad (3)$$

$$Y_c = K_y \frac{\sum_{k=i-1}^{i+1} \sum_{m=j-1}^{j+1} \text{Signal}[k,m] \cdot m}{\sum_{k=i-1}^{i+1} \sum_{m=j-1}^{j+1} \text{Signal}[k,m]}$$

where $K_x$, $K_y$ may be determined depending on the required resolution. For example, for a 320×480 resolution, $$K_x = \frac{320}{M-1}; K_y = \frac{480}{N-1}.$$

An additional jitter filter may be used, operation 495, for each $X_c$ and $Y_c$ values, according to one embodiment of the present invention. The above algorithm (5) uses integer arithmetic only and, therefore, can readily be implemented inside a processing device that only supports integer arithmetic. Alternative embodiments of the present invention include algorithms that use non-integer arithmetic.

Alternative Algorithm with Bicubic Splines

Figure 5:
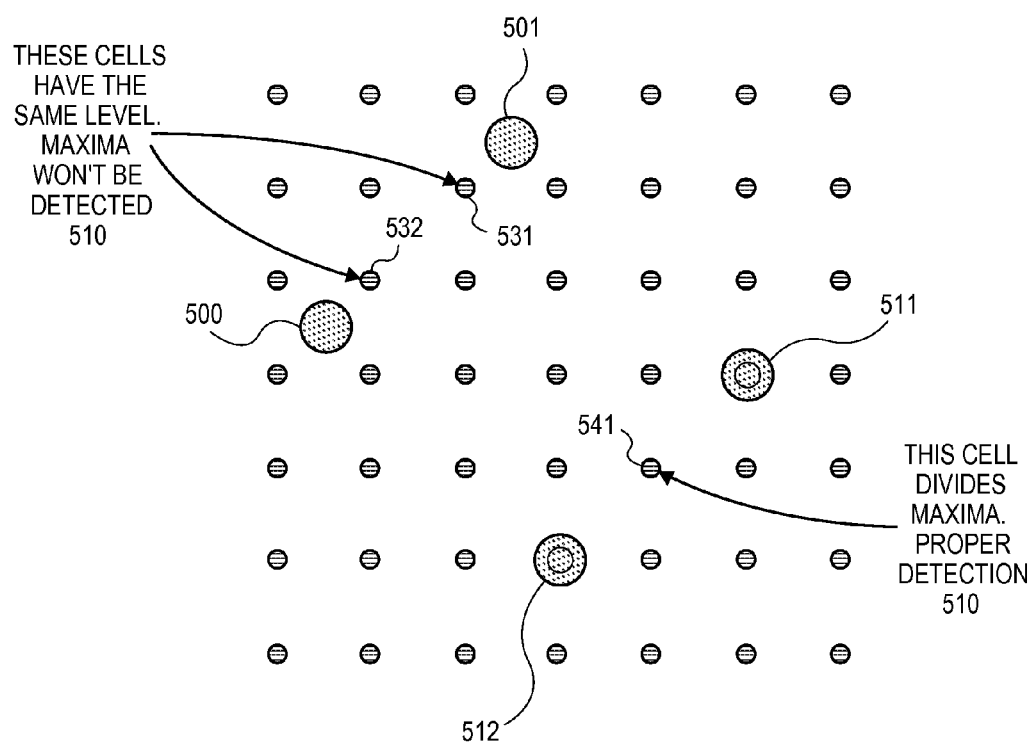
FIG. 5 illustrates maxima detection conditions when two fingers are placed close to one another depending on their positions relative to the touch pad grid according to an embodiment.

The above described algorithm does not specify a high performance CPU for touch positions estimation. Nevertheless, if two fingers are placed close one to another then, depending on their position relative to the touch pad grid, the maxima can be detected properly or not detected, as illustrated in FIG. 5. Two cases are shown in FIG. 5. The first case 500 (top-left in FIG. 5) has finger touch positions 501 and 502. Cells 531 and 532 are the cells diagonally between positions 501 and 502, and have the same level. Case 510 corresponds to wrong maxima detection because there is no cell with local minimum between two diagonal cells. The second case 501 (bottom-right of FIG. 5) has finger touch positions 511 and 512, and a single cell 541 diagonally between them. In second case 510, the distance between the two touch positions 511 and 512 is the same as in the first case 510. But, due to different locations relatively to the grid cells, the maxima are detected properly in case 510.

To avoid this issue, a resampling up technique is used according to one embodiment of the present invention. In this embodiment, the original M×N grid may be replaced by a denser grid using, for example, bicubic splines, or other interpolation method. For instance, two additional cells may be inserted between each original node. So, new grid has dimension is (M−1)·3+1 by (N−1)·3+1. Since the new grid is calculated, all the above described algorithms can be used for touch position estimation. The only one difference is in the centroid formula due to a smaller cell dimension:

$$X_c = K_x \frac{\sum_{k=i-4}^{i+4} \sum_{m=j-4}^{j+4} \text{Signal}[k,m] \cdot k}{\sum_{k=i-4}^{i+4} \sum_{m=j-4}^{j+4} \text{Signal}[k,m]} \quad (4)$$

$$Y_c = K_y \frac{\sum_{k=i-4}^{i+4} \sum_{m=j-4}^{j+4} \text{Signal}[k,m] \cdot m}{\sum_{k=i-4}^{i+4} \sum_{m=j-4}^{j+4} \text{Signal}[k,m]}$$

In other words, in this case the centroid position is calculated from 9×9=81 new grid cells. An algorithm with splines requires much more memory and CPU computational performance due to the complexity of the algorithm and floating point arithmetic. Therefore, in one embodiment, the algorithm with Bicubic Splines may be implemented on host processor 250 of FIG. 2. Alternatively, the algorithm with Bicubic Splines may be implemented in the processing device 210 which can be coupled to a touch sensor array 410, which in one embodiment may form a touch pad sensor device.

It will be evident that various modifications and changes may be made to these embodiments without departing from the broader spirit and scope as set forth in the claims. Accordingly, the specification and drawings are to be regarded in an illustrative rather than a restrictive sense.

What is claimed is:

1. A method, comprising:
    scanning, by a processing device, a touch sensor array to generate a grid of cells corresponding to the touch sensor array, wherein each cell in the grid of cells represents a measured capacitance on a sensor element in the touch sensor array;
    upsampling the grid of cells corresponding to the touch sensor array to generate an upsampled grid of cells comprising additional cells that is denser than the grid of cells corresponding to the touch sensor array, wherein each additional cell is located between at least two original cells, wherein each additional cell in the upsampled grid of cells represents an interpolated capacitance value based on the measured capacitance of the at least two original cells;
    detecting a plurality of local maximum cells of the upsampled grid of cells; and
    estimating a plurality of touch positions on the touch sensor array by calculating a corresponding plurality of centroids using cells adjacent to the detected local maximum cells.

2. The method of claim 1, wherein detecting a local maximum cell of the plurality of local maximum cells comprises:
    determining whether a signal of a current sensor element is above a presence threshold;
    comparing the signal of the current sensor element, when the signal of the current sensor element is above the presence threshold, with signals of all adjacent sensor elements to the current sensor element; and
    storing row and column numbers of the current sensor element as coordinates of the local maximum cell.

3. The method of claim 2, wherein the detecting the local maximum cell comprises using one of a Hill Climbing technique or a Gradient Descent technique.

4. The method of claim 2, wherein the signal represents a sensor element capacitance.

5. The method of claim 2, further comprising jitter filtering a result of the calculation of the centroid.

6. The method of claim 2, wherein prior to detecting the local maximum cell, the method further comprises filtering raw data generated from the scanning.

7. The method of claim 6, wherein after filtering, the method further comprises establishing a baseline for the signal of a current sensor element using the filtered raw data.

8. The method of claim 7, wherein establishing a baseline comprises using a baseline calculation algorithm having an infinite impulse response (IIR) low pass filter (LPF).

9. The method of claim 1, wherein the upsampled grid of cells is generated using bicubic splines.

10. An apparatus, comprising:
    processing logic configured to scan a touch sensor array to generate a grid of cells corresponding to the touch sensor array, wherein each cell in the grid of cells represents a measured capacitance on a sensor element in the touch sensor array, upsample the grid of cells corresponding to the touch sensor array to generate an upsampled grid of cells comprising additional cells that is denser than the grid of cells corresponding to the touch sensor array, wherein each additional cell is located between at least two original cells, wherein each additional cell in the upsampled grid of cells represents an interpolated capacitance value based on the measured capacitance of the at least two original cells, and detect a plurality of local maximum cells of the upsampled grid of cells, wherein the processing logic is further configured to estimate a plurality of touch positions on the touch sensor array by calculating a corresponding plurality of centroids using cells adjacent to the detected local maximum cells.

11. The apparatus of claim 10, wherein in detecting a local maximum cell of the plurality of local maximum cells, the processing logic is configured to:
    determine whether a signal of a current sensor element is above a presence threshold,
    compare the signal of the current sensor element, when the signal of the current sensor element is above the presence threshold, with signals of adjacent sensor elements to the current sensor element, and
    store row and column numbers of the current sensor element as coordinates of the local maximum cell.

12. The apparatus of claim 10, wherein the signal represents a sensor element capacitance.

13. The apparatus of claim 12, wherein the processing logic is further configured to jitter filter a result of the calculation of the centroid.

14. The apparatus of claim 10, further comprising the touch sensor array operatively coupled with the processing logic.

15. The apparatus of claim 14, wherein the processing logic resides within a processing device coupled between the touch sensor array and a host.

16. The apparatus of claim 14, wherein the processing logic resides within a host.

17. The apparatus of claim 10, wherein the upsampled grid of cells is generated using bicubic splines.

18. An apparatus, comprising:
    means for scanning a touch sensor array to generate a grid of cells corresponding to the touch sensor array, wherein each cell in the grid of cells represents a measured capacitance on a sensor element in the touch sensor array;
    means for upsampling the grid of cells corresponding to the touch sensor array to generate an upsampled grid of cells comprising additional cells that is denser than the grid of cells corresponding to the touch sensor array, wherein each additional cell is located between at least two original cells, wherein each additional cell in the upsampled grid of cells represents an interpolated capacitance value based on the measured capacitance of the at least two original cells;
    means for detecting a plurality of local maxima cells of the upsampled grid of cells; and
    means for estimating a plurality of touch positions on the touch sensor array by calculating a corresponding plurality of centroids using cells adjacent to the detected local maximum cells.

19. The apparatus of claim 18, wherein the means for detecting a plurality of local maximum cells comprises:
    means for determining whether a signal of a current sensor element is above a presence threshold;

means for comparing the signal of the current sensor element, when the signal of the current sensor element is above the presence threshold, with signals of adjacent sensor elements to the current sensor element; and means for storing row and column numbers of the current sensor element as coordinates of a local maximum cell.

20. The apparatus of claim 19, further comprising the touch sensor array operatively coupled with the means for scanning.

\* \* \* \* \*